United States Patent
Farooq et al.

(10) Patent No.: US 10,086,793 B2
(45) Date of Patent: Oct. 2, 2018

(54) VEHICLE WITH WATER DETECTION

(71) Applicant: Ford Global Technologies, LLC, Dearborn, MI (US)

(72) Inventors: S.M. Iskander Farooq, Novi, MI (US); Mohammed Omar Faruque, Ann Arbor, MI (US); Dean M. Jaradi, Macomb, MI (US)

(73) Assignee: FORD GLOBAL TECHNGLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/433,622

(22) Filed: Feb. 15, 2017

(65) Prior Publication Data
US 2018/0229688 A1    Aug. 16, 2018

(51) Int. Cl.
*B60R 22/32*    (2006.01)

(52) U.S. Cl.
CPC ...... *B60R 22/322* (2013.01); *B60R 2022/327* (2013.01); *Y10T 24/45461* (2015.01)

(58) Field of Classification Search
CPC ................ B60R 22/322; B60R 22/321; B60R 2022/327; Y10T 24/45461
See application file for complete search history.

(56) References Cited

U.S. PATENT DOCUMENTS

| | | | |
|---|---|---|---|
| 4,014,080 A | 3/1977 | Caradec | |
| 5,765,660 A * | 6/1998 | Ambrosi | B60R 22/322 180/268 |
| 6,123,166 A | 9/2000 | Verellen | |
| 6,922,622 B2 * | 7/2005 | Dulin | B06B 1/0215 180/272 |
| 7,717,216 B2 * | 5/2010 | Van Rooyen | B60R 22/322 180/268 |
| 7,784,578 B2 * | 8/2010 | Cantu | B60J 5/042 180/268 |
| 7,941,902 B1 | 5/2011 | Roy et al. | |
| 9,084,452 B2 | 7/2015 | Blackman et al. | |
| 2008/0116681 A1 | 5/2008 | Van Rooyen | |

FOREIGN PATENT DOCUMENTS

| | | |
|---|---|---|
| DE | 2734541 A1 | 2/1979 |
| JP | 63-247149 | * 10/1988 |
| JP | 2000043659 A | 2/2000 |
| JP | 2004249783 A | 9/2004 |

OTHER PUBLICATIONS

Search Report dated Jul. 31, 2018 from the United Kingdom Intellectual Property Office regarding Application No. GB1802283.0 (4 pages).

* cited by examiner

*Primary Examiner* — Michael J Zanelli
(74) *Attorney, Agent, or Firm* — Frank A. MacKenzie; Bejin Bieneman PLC

(57) ABSTRACT

A vehicle includes an engine compartment and two rockers fixed relative to the engine compartment. The two rockers define a passenger cabin. A first water sensor is disposed in the engine compartment, and second and third water sensors are disposed in the passenger cabin at the rockers. A seatbelt buckle is disposed in the passenger cabin and has an actuator. A control module is in communication with the water sensors and the actuator. The control module is programmed to actuate the actuator based on signals from the water sensors.

16 Claims, 6 Drawing Sheets

VEHICLE WITH WATER DETECTION

BACKGROUND

When a vehicle enters a body of water, an occupant has approximately 1 or 2 minutes to exit the vehicle before the vehicle sinks. Because an engine and transmission are typically relatively heavy components of the vehicle, the vehicle begins to tip nose down upon entering the body of water. If the door is underwater, pressure from the water will prevent the occupant from opening the door. After between 30 seconds and 1 minute, the water rises to the bottom of the window of the vehicle. Once the water is above the bottom of the window, pressure from the water pushes the window against the frame of the door, preventing the window from opening. In order to exit the vehicle, the occupant must either shatter the window or wait until water has completely filled the passenger cabin, equalizing the pressure and allowing the door to open.

DETAILED DESCRIPTION

Figure 1:
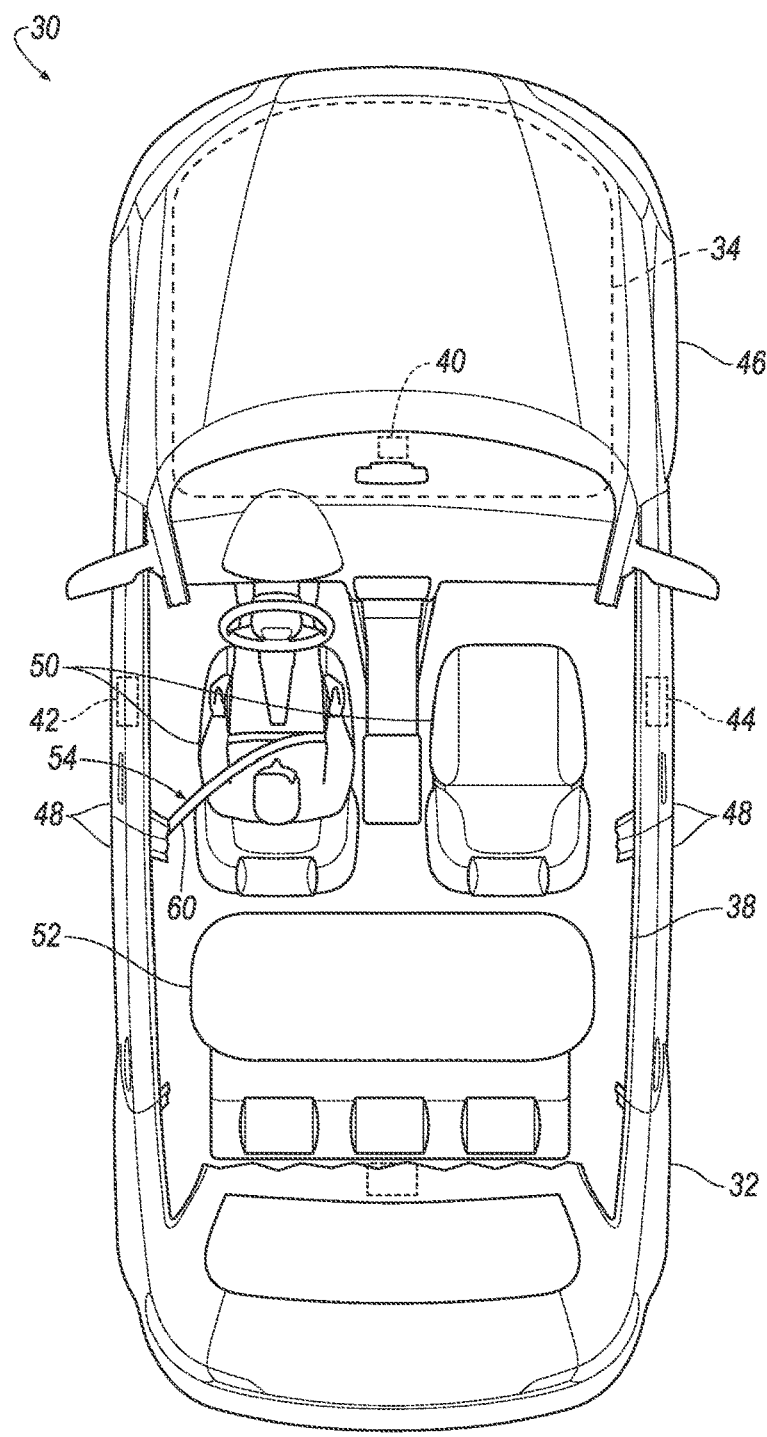
FIG. 1 is a top view of a vehicle with a roof removed for illustration.

With reference to the Figures, wherein like numerals indicate like parts throughout the several views, a vehicle 30 includes an engine compartment 34 and two rockers 36 fixed relative to the engine compartment 34. The two rockers 36 define a passenger cabin 38. A first water sensor 40 is disposed in the engine compartment 34, and second and third water sensors 42, 44 are disposed in the passenger cabin 38 at the rockers 36. (The adjectives "first," "second," and "third" are used throughout this document as identifiers and are not intended to signify importance or order.) A seatbelt buckle 56 is disposed in the passenger cabin 38 and has an actuator 74. A control module 80 is in communication with the water sensors 40, 42, 44 and the actuator 74. The control module 80 is programmed to actuate the actuator 74 based on signals from the water sensors 40, 42, 44.

The control module 80 may also be programmed to actuate the actuator 74 based on signals indicating water presence from at least two of the water sensors 40, 42, 44.

The control module 80 may also be programmed to actuate the actuator 74 based on signals indicating water presence from the first water sensor 40 and from at least one of the second and third water sensors 42, 44.

The actuator 74 may be a pyrotechnic actuator. Additionally, the actuator 74 may be a linear actuator. Additionally, the seatbelt buckle 56 may include a buckle release tab 70, and the actuator 74 may be coupled to the buckle release tab 70. Additionally, the buckle release tab 70 may be movable between a latched position and a released position, and the actuator 74 may be attached to the buckle release tab 70 to pull the buckle release tab 70 to the released position when actuated.

The control module 80 may be disposed at a rear of passenger cabin 38. Additionally, the control module 80 may be disposed at an opposite end of the passenger cabin 38 from the engine compartment 34. Additionally, the control module 80 may be disposed in a vehicle-upward direction relative to the seatbelt buckle 56.

The third water sensor 44 may be disposed in a vehicle-lateral direction from the second water sensor 42. Additionally, the second and third water sensors 42, 44 may be disposed in a vehicle-downward direction relative to the first water sensor 40. Additionally, the first water sensor 40 may be disposed at an angle from the second and third water sensors 42, 44 relative to the vehicle-forward direction, and the angle is in a range from 10 degrees to 25 degrees.

The second and third water sensors 42, 44 may be disposed in a vehicle-forward direction relative to the seatbelt buckle 56.

The second and third water sensors may be disposed in a vehicle-downward direction relative to the seatbelt buckle 56.

The actuator 74 may be configured to unlatch the seatbelt buckle 56.

The control module 80 may be programmed to activate an alarm based on signals from the water sensors 40, 42, 44.

The vehicle 30 may provide an occupant with additional time to exit the vehicle 30 if the vehicle 30 becomes submerged in water. The occupant does not need to spend time unlatching the buckle 56 before attempting to exit the vehicle 30. The number and arrangement of the water sensors 40, 42, 44 reduce the risk of "false positives," that is, unlatching the buckle 56 when the vehicle 30 is not submerged. Having the water sensors 40, 42, 44 spread around the vehicle 30 as described provides a sampling of a wide area to allow the control module 80 to determine whether the vehicle 30 is submerged.

Figure 2:
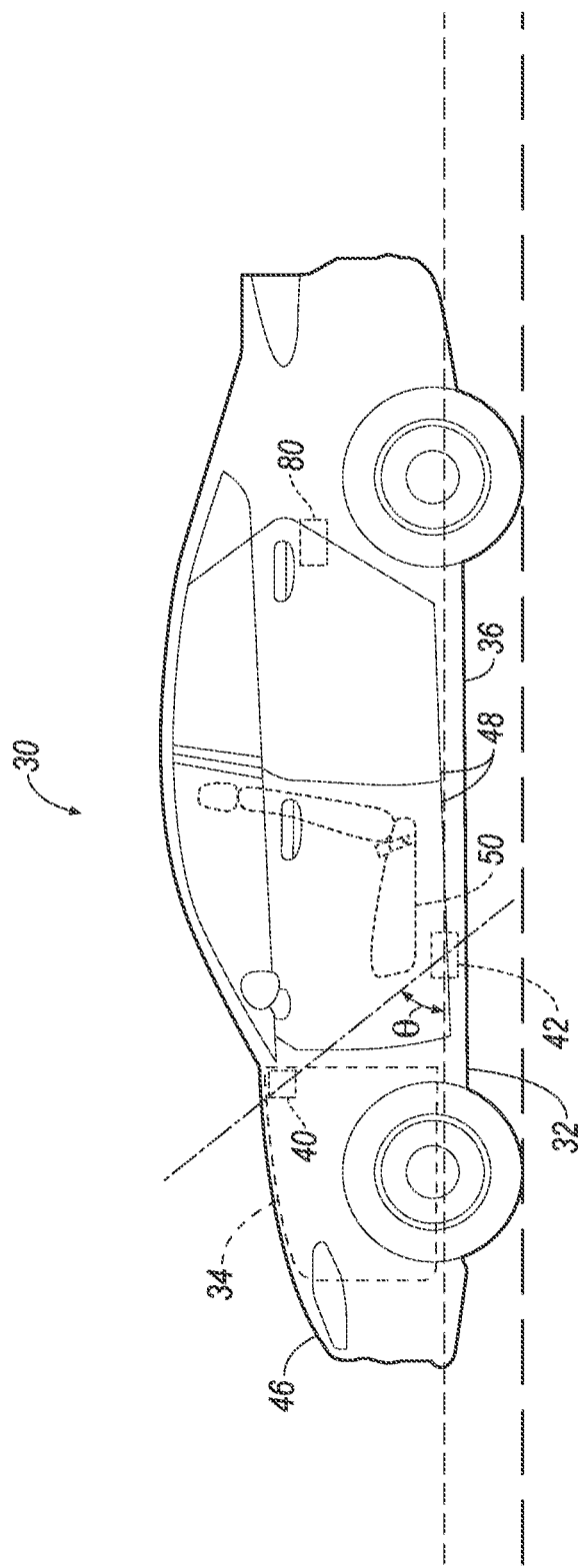
FIG. 2 is a side view of the vehicle.
Figure 3:
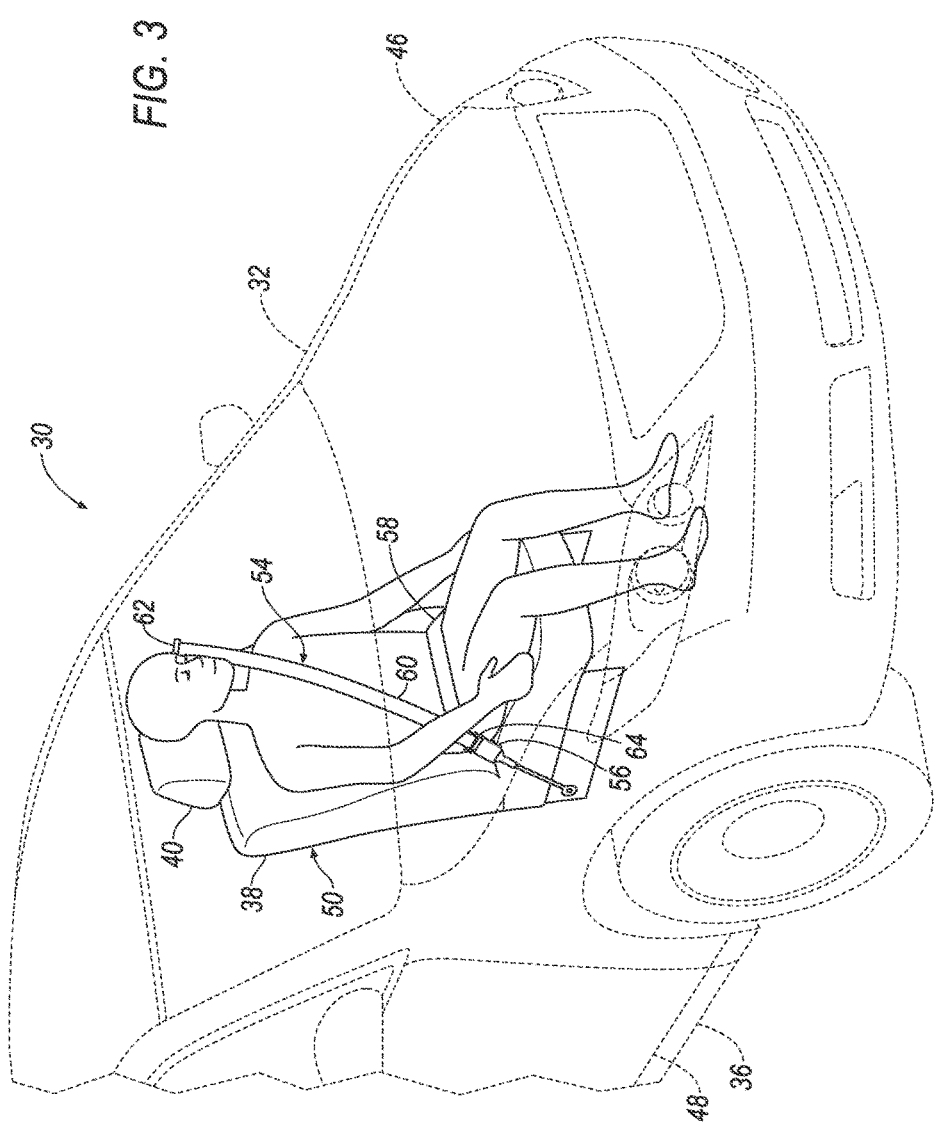
FIG. 3 is a perspective view of the vehicle.

With reference to FIGS. 1-3, the vehicle 30 includes a body 32. The vehicle 30 may be of a unibody construction, in which a frame and the body 32 of the vehicle 30 are a single component, as shown in the Figures. The vehicle 30 may, alternatively, be of a body-on-frame construction, in which a frame supports a body that is a separate component from the frame. The body 32 may be formed of any suitable material, for example, steel, aluminum, etc.

With reference to FIGS. 1 and 2, the engine compartment 34 is a cavity in the vehicle 30 sized to accept an engine (not shown) of the vehicle 30. The engine compartment 34 may be defined by the body 32 of the vehicle 30. The engine compartment 34 may be disposed in a front end 46 of the vehicle 30 in a vehicle-forward direction from the passenger cabin 38.

With reference to FIGS. 2-3, the body 32 includes the two rockers 36. The rockers 36 are fixed relative to the engine compartment 34. More specifically, the rockers 36 may be part of the body 32 that defines the engine compartment 34. The rockers 36 may be elongated in a vehicle-forward direction. The rockers 36 may extend along sides of the vehicle 30 below doors 48. The rockers 36 may have a tubular shape. The rockers 36 may present class-A surfaces toward the outside of the vehicle 30, or alternatively they may be covered with rocker panels (not shown).

With reference to FIG. 1, the rockers 36 may define the passenger cabin 38. The passenger cabin 38 may be disposed between the rockers 36 and in a vehicle-rearward direction relative to the engine compartment 34.

The vehicle 30 includes the passenger cabin 38 to house occupants, if any, of the vehicle 30. The passenger cabin 38 includes one or more front seats 50 disposed at a front of the passenger cabin 38 and one or more back seats 52 disposed behind the front seats 50. The passenger cabin 38 may also include third-row seats (not shown) at a rear of the passenger cabin 38. In FIG. 1, the front seats 50 are shown to be bucket seats, and the back seats 52 are shown to be bench seats, but the seats 50, 52 may be other types. The position and orientation of the seats 50, 52 and components thereof may be adjustable by an occupant.

With reference to FIG. 3, each seat may include a seatbelt assembly 54. An anchor 58 attaches one end of a webbing 60 to the seat or fixes the end of the webbing 60 to the body 32. The other end of the webbing 60 feeds into a retractor 62, which may be fixed to the seat or to a pillar of the body 32. The retractor 62 may include a spool (not shown) that extends and retracts the webbing 60. A clip 64 slides freely along the webbing 60 and, when engaged with the seatbelt buckle 56, divides the webbing 60 into a lap band and a shoulder band. The buckle 56 may be fixed to the seat or to the body 32 at an opposite side of the seat from the anchor 58. The seatbelt system may be a three-point harness, meaning that the webbing 60 is attached at three points around the occupant when fastened: the anchor 58, the retractor 62, and the buckle 56. The seatbelt system may, alternatively, include another arrangement of attachment points.

Figure 4:
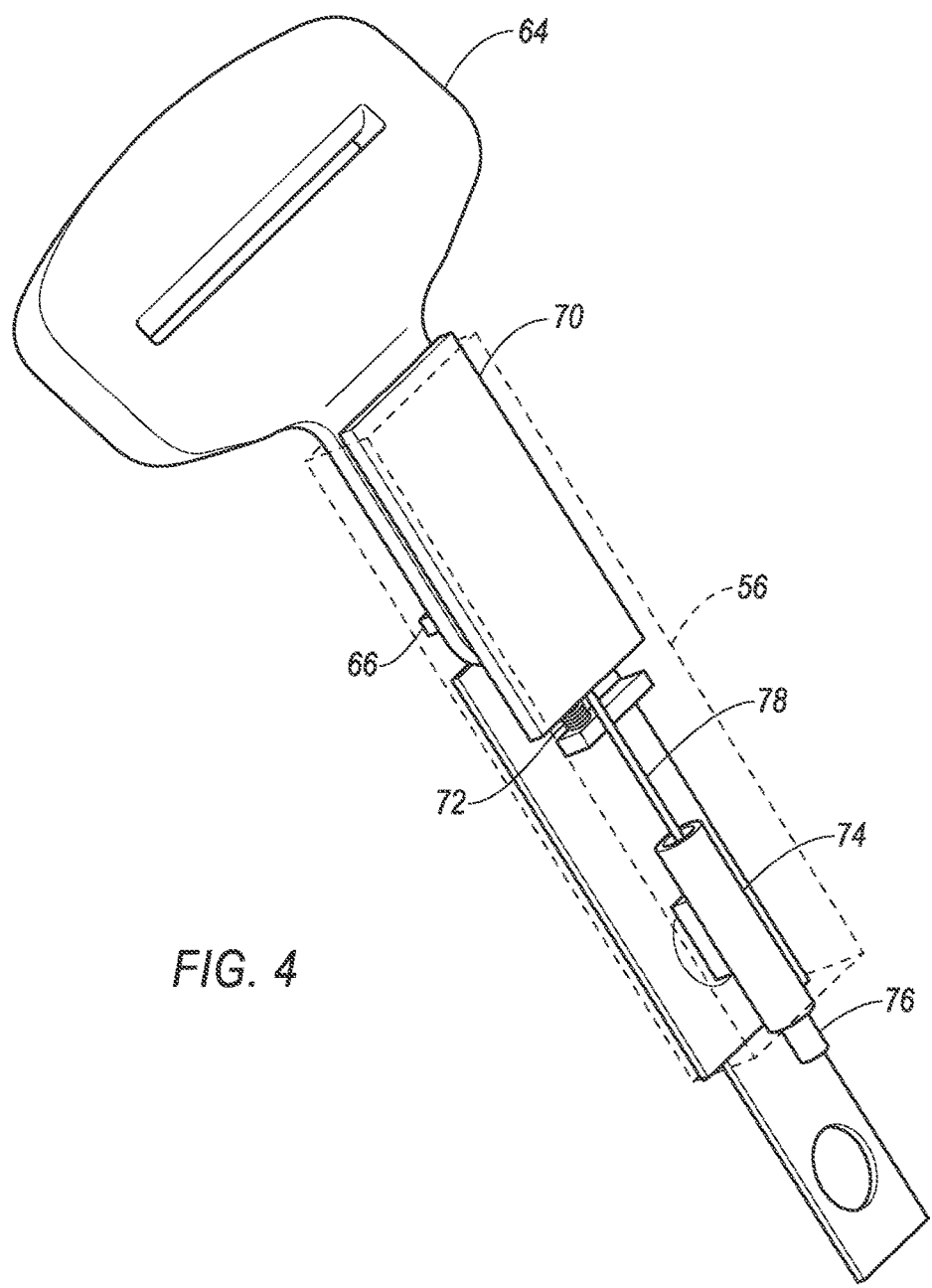
FIG. 4 is a perspective view of a seatbelt buckle of the vehicle in a latched position.
Figure 5:
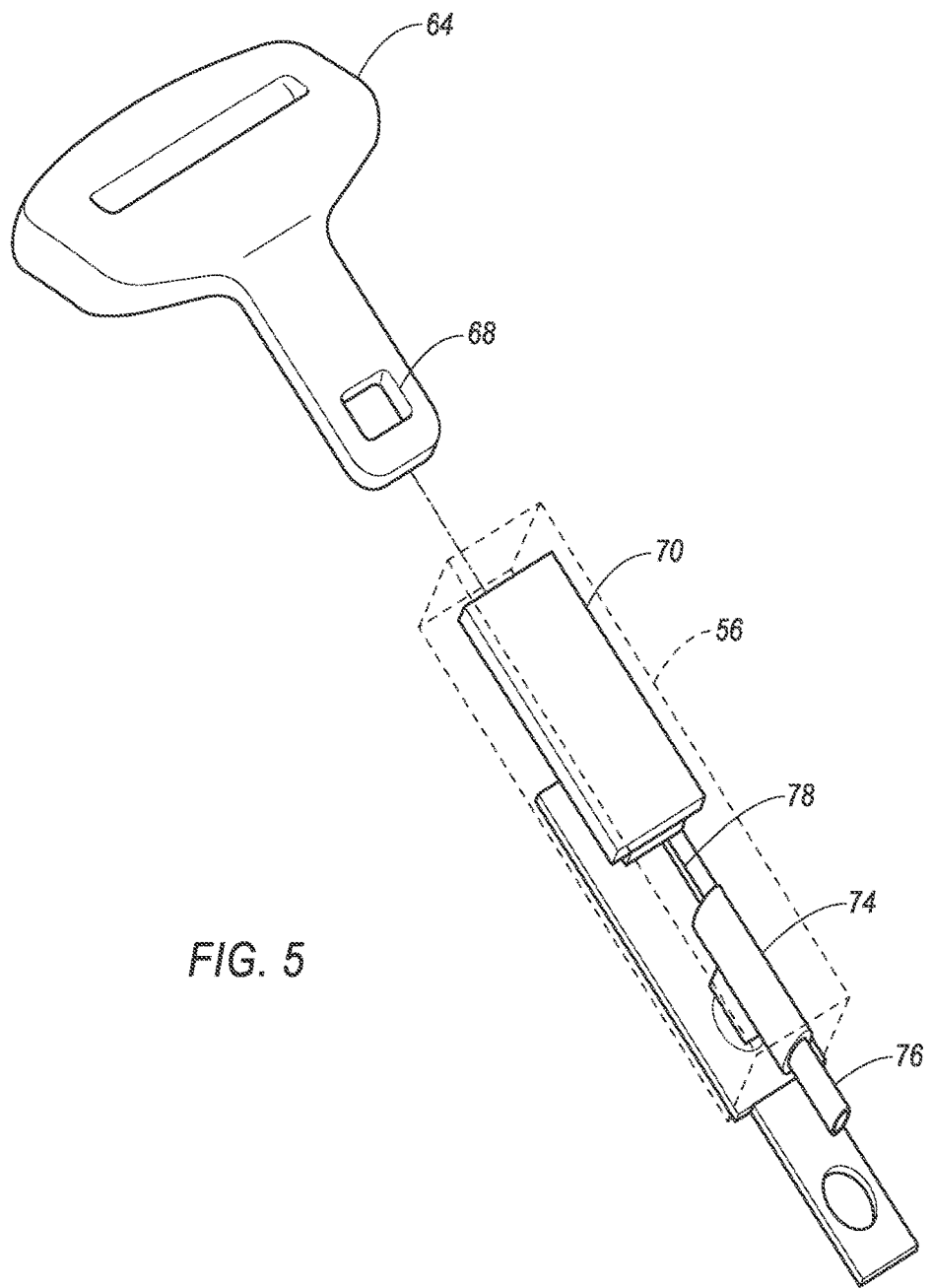
FIG. 5 is a perspective view of the seatbelt buckle of the vehicle in the released position.

With reference to FIGS. 4 and 5, the buckle 56 receives and latches onto the clip 64. The buckle 56 includes a latch 66 designed to pass through a hole 68 on the clip 64, a buckle release tab 70 coupled to the latch 66, and a clip spring 72 positioned to push against the clip 64 when the clip 64 is inserted into the buckle 56. The buckle release tab 70 is movable between a latched position, as shown in FIG. 4, and a released position, as shown in FIG. 5. A buckle-release-tab spring (not shown) may bias the buckle release tab 70 into the latched position. An occupant may push against the buckle release tab 70 to move the buckle release tab 70 from the latched position to the released position. The buckle release tab 70 may be coupled to the latch 66 so that the latch 66 is pressed into the hole 68 of the clip 64 when the buckle release tab 70 is in the latched position and the latch 66 is pulled out of the hole 68 when the buckle release tab 70 is in the released position. The clip spring 72 may push the clip 64 out of the buckle 56 when the buckle release tab 70 is in the released position.

With reference to FIGS. 1 and 2, the water sensors 40, 42, 44 may be any type of sensor capable of detecting the presence of water, as is known. For example, the water sensors 40, 42, 44 may each include two electrical leads that, when connected, close a circuit; when water is present between the leads, the conductivity of water changes allows current to flow or changes how much current is flowing by a known amount. For another example, the water sensors 40, 42, 44 may each include an LED bulb, a light sensor, and possibly a prism reflecting light from the LED bulb to the light sensor; the presence of water scatters some of the light, reducing the light received by the light sensor by a known amount.

The first water sensor 40 is disposed in the engine compartment 34. More specifically, the first water sensor 40 may be coupled to a vehicle-rearward side of the engine compartment 34. The first water sensor 40 may be located substantially on a centerline of the vehicle 30 along a vehicle-forward direction. The first water sensor 40 may be disposed in a vehicle-upward direction relative to the second and/or third water sensors 42, 44. The vehicle-upward direction is vertical to the ground when the vehicle 30 is resting with all tires on the ground.

The second and third water sensors 42, 44 are disposed in the passenger cabin 38 at the rockers 36. More specifically, the second and third water sensors 42, 44 are located at a height substantially the same in the vehicle-upward direction as the rockers 36 and at vehicle-lateral positions substantially the same as the rockers 36. The second and third water sensors 42, 44 are located in a vehicle-lateral direction from each other. The second and third water sensors 42, 44 may be located in a vehicle-downward and vehicle-rearward direction from the first water sensor 40. The second and third water sensors 42, 44 may be disposed in a vehicle-forward and vehicle-downward direction relative to the buckle 56.

With reference to FIG. 2, the first water sensor 40 is disposed at an angle $\theta$ from the second and third water sensors 42, 44 relative to a vehicle-forward direction, that is, an angle $\theta$ as seen in a side view of the vehicle 30, that is, an angle $\theta$ as projected laterally relative to the vehicle 30. The angle $\theta$ may be substantially the same as an angle that the vehicle 30 would tip forward when immersed in water at the point at which water begins to enter the passenger cabin 38, that is, a nose-dip angle $\theta$. The angle $\theta$ may be in a range from 10 degrees to 25 degrees.

Figure 6:
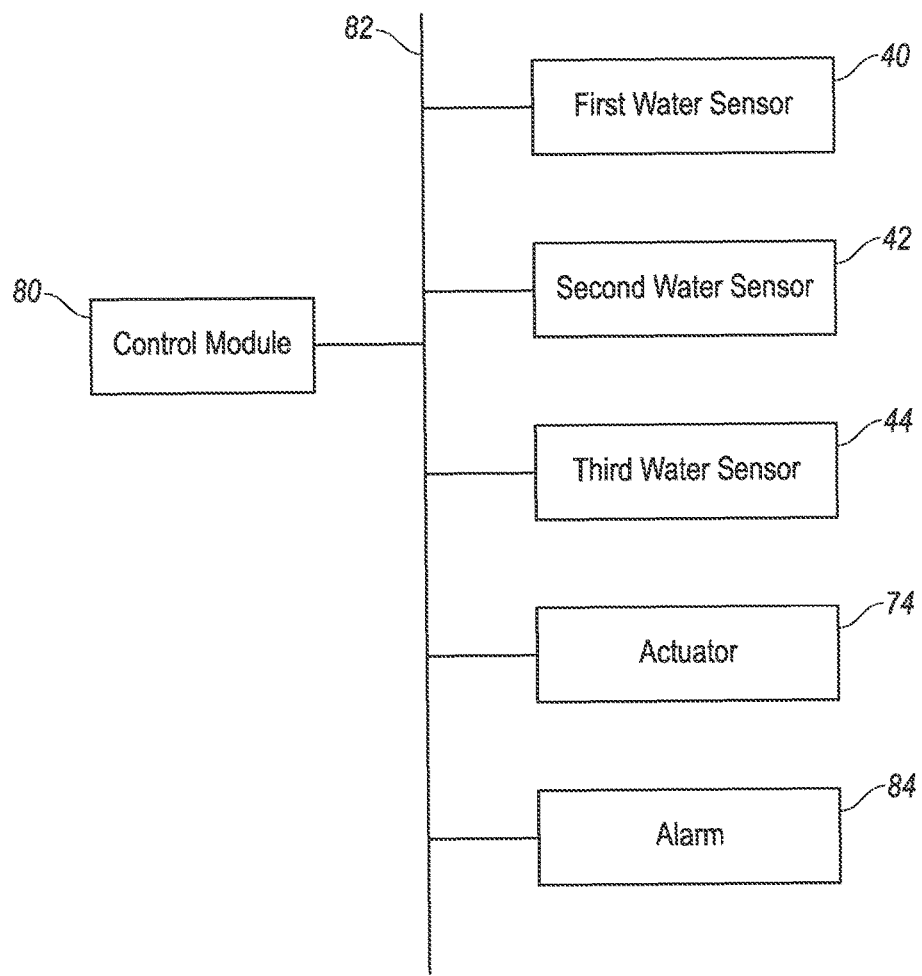
FIG. 6 is a block diagram of a control system for the vehicle.

With reference to FIG. 6, the control module 80 may be in communication with the water sensors 40, 42, 44 and the actuator 74. The control module 80 may transmit signals through a communications network 82 such as a controller area network (CAN) bus, Ethernet, Local Interconnect Network (LIN), and/or by any other wired or wireless communications network.

The control module 80 may be a microprocessor-based controller. The control module 80 may include a processor, memory, etc. The memory of the control module 80 may include memory for storing instructions executable by the processor as well as for electronically storing data and/or databases. The control module 80 may be a dedicated control module, that is, may receive and send messages only to and from the water sensors 40, 42, 44 and the actuator 74; alternatively, the control module 80 may also support other functions. For example, the control module 80 may be a restraint control module and may be in communication with and may control airbags (not shown) in the vehicle 30, among other functions.

With reference to FIGS. 1 and 2, the control module 80 may be disposed at a rear of the passenger cabin 38, that is, at an opposite end of the passenger cabin 38 from the engine compartment 34. In other words, the passenger cabin 38 includes a rear and a front opposite the rear in a vehicle fore-and-aft direction. The engine compartment 34 may be at the front of the passenger compartment 34, and specifically, may be forward of the passenger compartment 34 in a vehicle-forward direction from the passenger compartment 34. The control module 80 may be disposed in vehicle-rearward and vehicle-upward direction from the buckle 56 and/or the second and third water sensors 42, 44.

With reference to FIGS. 4-6, the actuator 74 is in communication with the control module 80. The actuator 74 may be a linear actuator, that is, an actuator that actuates in a straight direction. The actuator 74 may be movable from a charged position, as shown in FIG. 4, to a discharged position, as shown in FIG. 5. The actuator 74 may be a pyrotechnic actuator. The actuator 74 may include a pyrotechnic charge (not shown) and a piston 76 configured to move when the pyrotechnic charge discharges. The actuator 74 may discharge the pyrotechnic charge upon a signal from the control module 80. When the pyrotechnic charge discharges, the piston 76 moves linearly, and the actuator 74 thus changes from the charged position to the discharged position.

With reference to FIGS. 4 and 5, the actuator 74 may be disposed in the buckle 56 and configured to unlatch the buckle 56. The actuator 74 is coupled to the buckle release tab 70. The actuator 74 may be connected to the buckle release tab 70 via a wire 78. The actuator 74 may be attached to the buckle release tab 70 so as to pull the buckle release tab 70 to the released position when actuated. The actuator 74 and the wire 78 may be aligned in a direction that the buckle release tab 70 is movable. The wire 78 may be connected to the piston 76, and when the actuator 74 is discharged, the piston 76 pulls the wire 78, which pulls the buckle release tab 70 to the released position.

The control module 80 may be programmed to actuate the actuator 74 based on signals from the water sensors 40, 42, 44. For example, if at least two of the three water sensors 40, 42, 44 indicate water presence, the control module 80 may be programmed to actuate the actuator 74 in response. For another example, if the first water sensor 40 and at least one of the second and third water sensors 42, 44 indicate water presence, the control module 80 may be programmed to actuate the actuator 74 in response. The control module 80 may be programmed to activate an alarm 84 based on signals from the water sensors 40, 42, 44, for example, in the same situations as the control module 80 is programmed to actuate the actuator 74. The alarm 84 may be visual and/or auditory, such as a flashing icon on an instrument panel and/or a beeping from a horn or speaker.

In the event that the vehicle 30 enters a body of water deeper than the vehicle 30, the vehicle 30 is likely to begin to tip forward because the front end 46, containing the engine, is heavier than the back end of the vehicle 30. The engine compartment 34 floods with water. The first water sensor 40 may send a signal to the control module 80 through the communications network 82 indicating the presence of water. When the vehicle 30 is tilted forward at approximately the nose-dip angle θ, water begins to enter the passenger cabin 38. Before the rising water reaches the buckle 56, one or both of the second and third water sensors 42, 44 may send a signal to the control module 80 indicating the presence of water. The control module 80 sends a signal to the actuator 74 to actuate, and the actuator 74 pulls the wire 78, pulling the buckle release tab 70 and unlatching the clip 64 from the buckle 56. The control module 80 activates the alarm 84. An occupant may then attempt to exit the vehicle 30. In doing so, the occupant may be afforded more time to exit the vehicle 30 because the occupant does not have to manually unlatch the buckle 56. By requiring signals from multiple water sensors 40, 42, 44, the control module 80 is less likely to actuate the actuator 74 when the vehicle 30 is not actually in water.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   an engine compartment and a first water sensor therein;
   two rockers fixed relative to the engine compartment and defining a passenger cabin;
   second and third water sensors disposed in the passenger cabin at the two rockers, respectively;
   a seatbelt buckle in the passenger cabin having an actuator; and
   a control module in communication with the water sensors and actuator and programmed to actuate the actuator based on signals indicating water presence from at least two of the water sensors.

2. The vehicle of claim 1, wherein the control module is programmed to actuate the actuator based on signals indicating water presence from the first water sensor and from at least one of the second and third water sensors.

3. The vehicle of claim 1, wherein the actuator is a pyrotechnic actuator.

4. The vehicle of claim 3, wherein the actuator is a linear actuator.

5. The vehicle of claim 4, wherein the seatbelt buckle includes a buckle release tab, and the actuator is coupled to the buckle release tab.

6. The vehicle of claim 5, wherein the buckle release tab is movable between a latched position and a released position, and the actuator is attached to the buckle release tab to pull the buckle release tab to the released position when actuated.

7. The vehicle of claim 1, wherein the control module is disposed at a rear of the passenger cabin.

8. The vehicle of claim 7, wherein the control module is disposed at an opposite end of the passenger cabin from the engine compartment.

9. The vehicle of claim 8, wherein the control module is disposed in a vehicle-upward direction relative to the seatbelt buckle.

10. The vehicle of claim 1, wherein the third water sensor is disposed in a vehicle-lateral direction from the second water sensor.

11. The vehicle of claim 10, wherein the second and third water sensors are disposed in a vehicle-downward direction relative to the first water sensor.

12. The vehicle of claim 11, wherein the first water sensor is disposed at an angle from the second and third water sensors relative to a vehicle-forward direction, and the angle is in a range from 10 degrees to 25 degrees.

13. The vehicle of claim 1, wherein the second and third water sensors are disposed in a vehicle-forward direction relative to the seatbelt buckle.

14. The vehicle of claim 1, wherein the second and third water sensors are disposed in a vehicle-downward direction relative to the seatbelt buckle.

15. The vehicle of claim 1, wherein the actuator is configured to unlatch the seatbelt buckle.

16. The vehicle of claim 1, wherein the control module is programmed to activate an alarm based on signals from the water sensors.

\* \* \* \* \*